May 24, 1949.        F. H. KENNEDY        2,470,990
METHOD OF MAKING INFLATED ARTICLES
Filed Aug. 31, 1948                                 2 Sheets-Sheet 1

INVENTOR
FRANK H. KENNEDY.
BY
ATTORNEY

May 24, 1949.  F. H. KENNEDY  2,470,990
METHOD OF MAKING INFLATED ARTICLES
Filed Aug. 31, 1948  2 Sheets-Sheet 2

INVENTOR
FRANK H. KENNEDY.
BY Raymond W. Cotton
ATTORNEY

Patented May 24, 1949

2,470,990

UNITED STATES PATENT OFFICE 2,470,990

METHOD OF MAKING INFLATED ARTICLES

Frank H. Kennedy, New York, N. Y.

Application August 31, 1948, Serial No. 47,121

12 Claims. (Cl. 154—85)

1

This invention relates to methods of producing fluid containing bodies from heat sealable plastic sheet material.

In the production of inflated toys, for example, from heat sealable plastic sheet material, it has been customary to form, inflate and close each toy individually. Such practices have been intrinsically uneconomical from the standpoints of both cost and efficiency, and it is among the objects of this invention to improve known procedures in these respects.

The improved method contemplates the simultaneous formation and simultaneous inflation of a plurality of such fluid containing bodies which are subsequently sealed and separated.

The method of making fluid containing bodies from heat sealable plastic sheet material here under consideration, comprises superimposing layers of such material, uniting proximate areas of the layers by heat sealing to form a plurality of inflatable envelopes interconnected by a manifold with a common fluid inlet, introducing fluid through the inlet and manifold into the envelopes, and closing the envelopes with respect to the inlet by heat sealing. A single sheet of the plastic material may be utilized to form the multiple plies, by partially slotting such material and folding it along the slotted portion. A decorative pattern may be applied to the surface of the sheet material where it is desired to depict a figure or outline, in which case the proximate areas may be united along bands substantially parallel to such a pattern. It is contemplated that the fluid be introduced at superatmospheric pressure of a value consistent with the degree of inflation desired and the characteristics of the material employed. Prior to the inflating step, the scrap material located externally of the united and/or decorated areas may be removed by means of suitable shearing dies. After the envelopes have been inflated, their common inlet will be closed to retain the fluid at the desired pressure, which closing step may likewise be effected by heat sealing. The step of closing the envelopes with respect to the inlet is preferably accomplished with respect to all of the envelopes simultaneously by means of heat sealing dies capable of effecting so-called electronic sealing. After the sealing operations have been performed, the inflated envelopes are severed with respect to the manifold to produce the unitary bodies ultimately desired.

This method is eminently suited to the production of a wide variety of articles and particularly well adapted for the production of permanently sealed inflated toys such as those selected for illustration herein.

A more complete understanding of the invention will follow from a detailed description of the accompanying drawings wherein.

Figure 3:
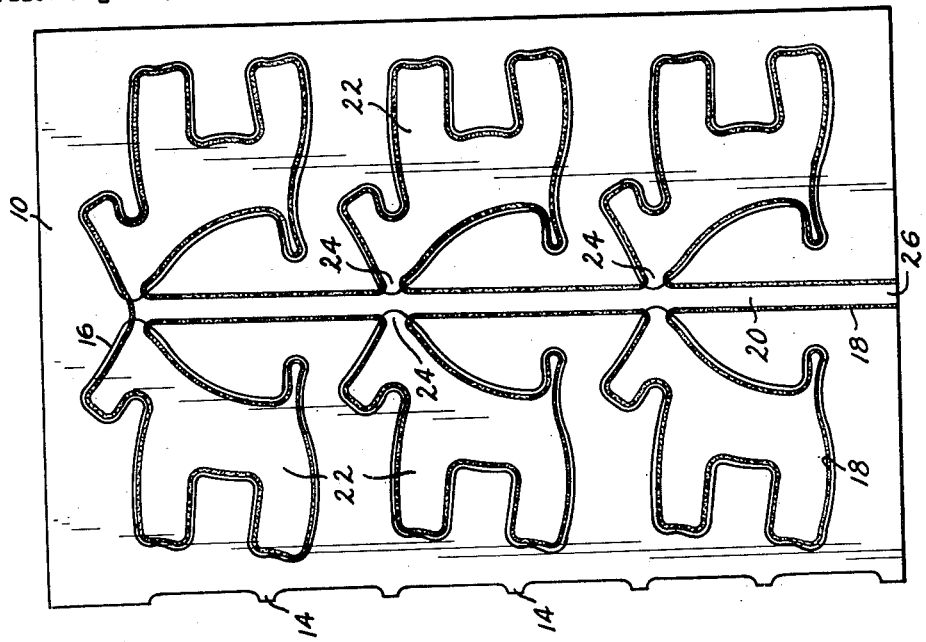
Fig. 3 is a plan view similar to Fig. 2, following a heat sealing operation which has united the superimposed plies of material along narrow bands to form partially closed enevelopes interconnected by a manifold produced by the same operation.
Figure 2:
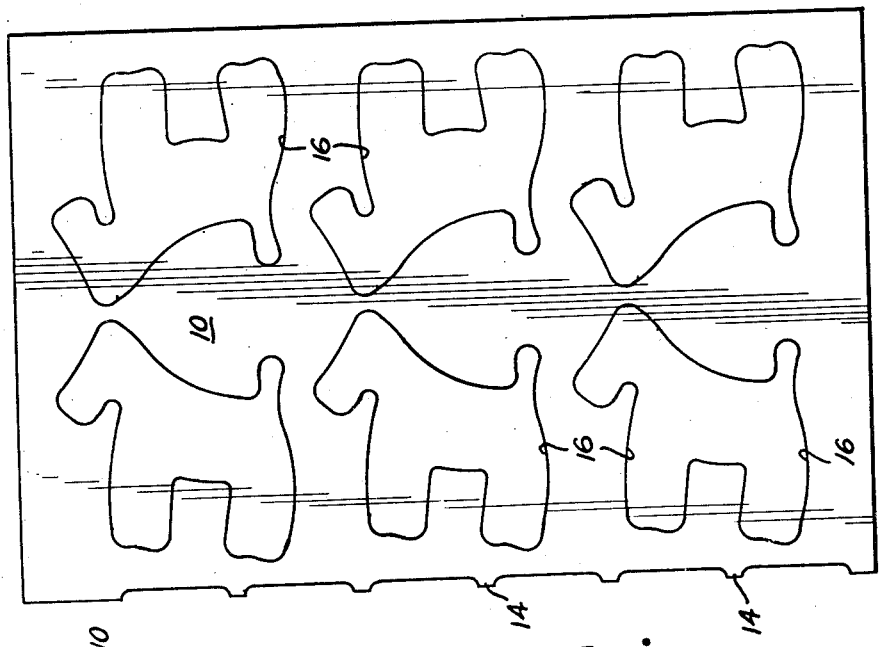
Fig. 2 is a plan view of such sheet material after it has been folded along its slotted portion and decorated with an outline depicting an animal.
Figure 1:
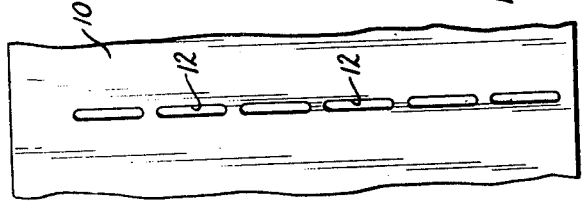
Fig. 1 is a fragmentary plan view of a sheet of heat sealable plastic material which has been subjected to a partial slotting operation.

A heat sealable sheet of plastic material 10, such as "Vinylite," as shown in Fig. 1, has been subjected to a slotting operation by suitable dies to define spaced elongated openings 12 which establish a folding line. The material retained between and adjacent the slots assumes the form of tabs 14 when the material has been doubled along its folding line as depicted in Fig. 2. One or more surfaces of the sheet material, usually the remote surfaces, may then be decorated by printing, silk screening, or other siutable operations, to produce desirable patterns, such as outlines 16, of multiple elements or units, for example, the dogs represented in Fig. 2. The partially completed article of Fig. 2 is then subjected to heat sealing dies, preferably of the electronic type, to unite the superimposed layers of the sheet material along band-like areas 18, shown in Fig. 3 as extending substantially parallel to the decorative outline 16 and also forming a manifold 20 interconnected with each of the envelopes 22 thus formed through their ports 24. The manifold provides a common inlet 26 adapted to connect all of the envelopes for simultaneous inflation from a source of fluid under pressure, not illustrated.

Figure 4:
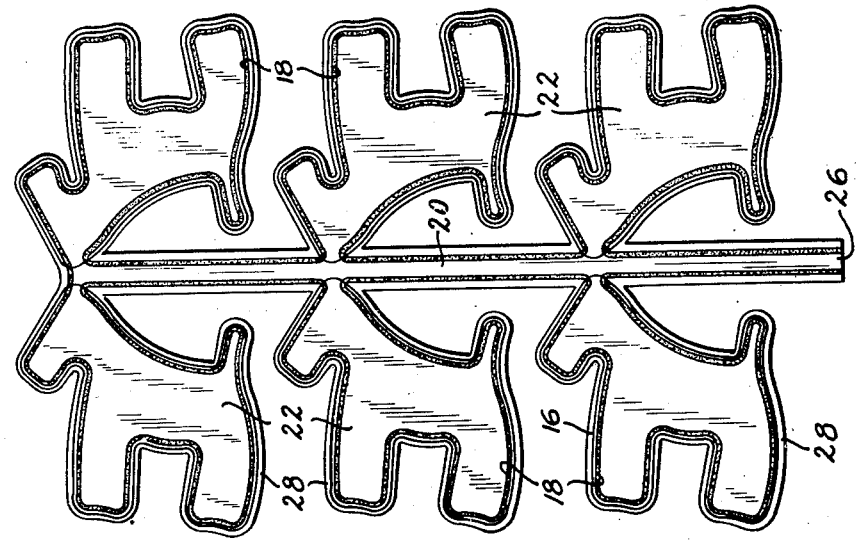
Fig. 4 is a plan view similar to Fig. 3 following a die cutting operation by which the extraneous material has been removed.

The article thus far completed is then trimmed to remove excess material along a line substantially parallel to the envelope and manifold, assuming a form substantially as that shown in Fig. 4. As depicted in this figure, a narrow marginal edge 28 extends beyond the outlines of the figured envelopes and manifold in order that the registry of the cutting dies used to remove the excess material from the work need not be extremely critical.

The article of Fig. 4 is then inflated with fluid introduced at the manifold inlet 26 until the desired fluid pressure has been established within the envelopes and manifold. Then the inlet will be closed with respect to the source of fluid supply and the article subjected to a further heat sealing operation to produce a seam 30 adjacent the inlet and seams 32 closing the individual envelopes with respect to their common manifold. The seam 30 near the inlet may be produced simultaneously with the seams 32 by the use of suitable dies of a type well known in the art for use with commercially available electronic heat sealing equipment. But in some cases it may be preferred to produce the inlet seam 30 prior to the formation of the seams 32 closing the envelopes with respect to their manifold. In other cases, a clamp may be employed to temporarily close the inlet while the seams 32 between the envelopes and the manifold are produced.

Figure 5:
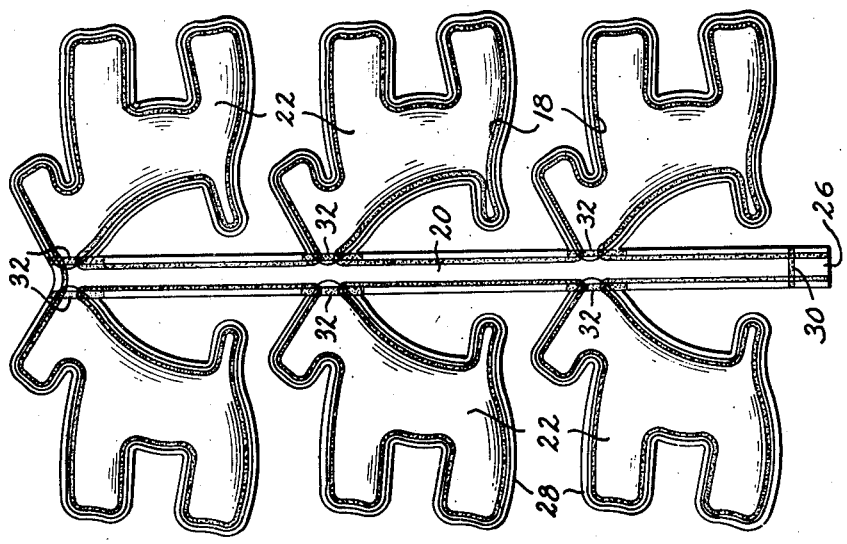
Fig. 5 is a plan view similar to Fig. 4 showing the envelopes after they have been inflated and individually sealed off with respect to the manifold and the manifold itself sealed off with respect to atmosphere.
Figure 6:
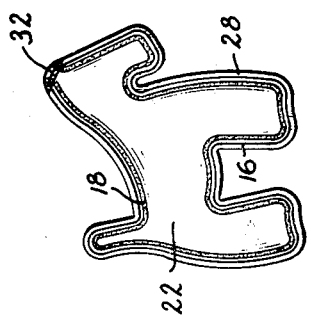
Fig. 6 is a plan view depicting a finished product formed by severing one of the sealed envelopes from the manifold of Fig. 5.

The envelopes or inflated bodies 22 are then detached from the assembly of Fig. 5 to produce the ultimate unit like that depicted in Fig. 6.

Whereas this invention has been described in its application to only one type of product, it will be evident to those skilled in the art that it is equally applicable to the production of a large variety of articles of an infinite number of sizes and shapes. Accordingly, the invention should not be construed as limited to the example employed herein for illustration, beyond the scope of the appended claims.

I claim:

1. A method of making fluid containing bodies from heat sealable plastic sheet material comprising superimposing layers of said material, uniting proximate areas of said layers by heat sealing to form a plurality of inflatable envelopes and a manifold interconnecting them with a common fluid inlet, introducing fluid through said inlet and manifold into said envelopes, and closing said envelopes with respect to said inlet by heat sealing.

2. A method of making fluid containing bodies from heat sealable plastic sheet material comprising slotting and folding said material to form superimposed layers, uniting proximate areas of said layers by heat sealing to form a plurality of inflatable envelopes and a manifold interconnecting them ith a common fluid inlet, introducing fluid through said inlet and manifold into said envelopes, and closing said envelopes with respect to said inlet by heat sealing.

3. A method of making fluid containing bodies from heat sealable plastic sheet material comprising decorating said material, superimposing layers of said material, uniting proximate areas of said layers by heat sealing to form a plurality of inflatable envelopes and a manifold interconnecting them with a common fluid inlet, introducing fluid through said inlet and manifold into said envelopes, and closing said envelopes with respect to said inlet by heat sealing.

4. A method of making fluid containing bodies from heat sealable plastic sheet material comprising forming a decorative pattern on said material, superimposing layers of said material, uniting proximate areas of said layers substantially parallel to said pattern by heat sealing to form a plurality of inflatable envelopes and a manifold interconnecting them with a common fluid inlet, introducing fluid through said inlet and manifold into said envelopes, and closing said envelopes with respect to said inlet by heat sealing.

5. A method of making fluid containing bodies from heat sealable plastic sheet material comprising superimposing layers of said material, uniting proximate areas of said layers by heat sealing to form a plurality of inflatable envelopes and a manifold interconnecting them with a common fluid inlet, introducing fluid at superatmospheric pressure through said inlet and manifold into said envelopes, and closing said envelopes with respect to said inlet by heat sealing.

6. A method of making fluid containing bodies from heat sealable plastic sheet material comprising superimposing layers of said material, uniting proximate areas of said layers by heat sealing to form a plurality of inflatable envelopes and a manifold interconnecting them with a common fluid inlet, severing material located externally of said areas, introducing fluid through said inlet and manifold into said envelopes, and closing said envelopes with respect to said inlet by heat sealing.

7. A method of making fluid containing bodies from heat sealable plastic sheet material comprising superimposing layers of said material, uniting proximate areas of said layers by heat sealing to form a plurality of inflatable envelopes and a manifold interconnecting them with a common fluid inlet, introducing fluid through said inlet and manifold into said envelopes, closing said inlet, and closing said envelopes with respect to said manifold by heat sealing.

8. A method of making fluid containing bodies from heat sealable plastic sheet material comprising superimposing layers of said material, uniting proximate areas of said layers by heat sealing to form a plurality of inflatable envelopes and a manifold interconnecting them with a common fluid inlet, introducing fluid through said inlet and manifold into said envelopes, and closing said inlet and envelopes with respect to said manifold by heat sealing.

9. A method of making fluid containing bodies from heat sealable plastic sheet material comprising superimposing layers of said material, uniting proximate areas of said layers by heat sealing to form a plurality of inflatable envelopes and a manifold interconnecting them with a common fluid inlet, introducing fluid through said inlet and manifold into said envelopes, and die closing said envelopes with respect to said inlet by heat sealing.

10. A method of making fluid containing bodies from heat sealable plastic sheet material comprising superimposing layers of said material, uniting proximate areas of said layers by heat sealing to form a plurality of inflatable envelopes and a manifold interconnecting them with a common fluid inlet, introducing fluid through said inlet and manifold into envelopes, and closing said envelopes with respect to said inlet by electronic sealing.

11. A method of making fluid containing bodies from heat sealable plastic sheet material comprising superimposing layers of said material, uniting proximate areas of said layers by heat sealing to form a plurality of inflatable envelopes and a manifold interconnecting them with a common fluid inlet, introducing fluid through said inlet and manifold into said envelopes, closing said envelopes with respect to said manifold by heat sealing, and severing said manifold from said envelopes.

12. A method of making fluid containing bodies from heat sealable plastic sheet material comprising superimposing layers of said material, uniting proximate areas of said layers by heat sealing to form a plurality of inflatable envelopes and a manifold interconnecting them with a common fluid inlet, die cutting said material externally of said envelopes and manifold, introducing fluid through said inlet and manifold into said envelopes, closing said envelopes with respect to said manifold by heat sealing, and severing said envelopes from said manifold.

FRANK H. KENNEDY.

REFERENCES CITED

The following references are of record in the file of this patent:

UNITED STATES PATENTS

| Number | Name | Date |
|---|---|---|
| 1,404,320 | Roberts et al. | Jan. 24, 1922 |
| 1,575,682 | Griffiths | Mar. 9, 1926 |
| 1,816,472 | Dorogi et al. | July 28, 1931 |
| 1,956,533 | Kelemen et al. | Apr. 24, 1934 |